Dec. 18, 1956 A. EDELMAN ET AL 2,774,959
LEVEL INDICATOR FOR SUPERVISING THE
LEVEL OF AGGLOMERATE MATERIALS
Filed April 23, 1953 2 Sheets-Sheet 1

INVENTORS
ABRAHAM EDELMAN
ROBERT M. FRANK
BY
ATTORNEY

Dec. 18, 1956 A. EDELMAN ET AL 2,774,959
LEVEL INDICATOR FOR SUPERVISING THE
LEVEL OF AGGLOMERATE MATERIALS
Filed April 23, 1953 2 Sheets-Sheet 2

INVENTORS
ABRAHAM EDELMAN
ROBERT M. FRANK

BY
ATTORNEY

United States Patent Office 2,774,959
Patented Dec. 18, 1956

2,774,959

LEVEL INDICATOR FOR SUPERVISING THE LEVEL OF AGGLOMERATE MATERIALS

Abraham Edelman, New York, and Robert M. Frank, Larchmont, N. Y., assignors to Photobell Company, New York, N. Y., a partnership composed of said Edelman and Johanna E. Edelman Application April 23, 1953, Serial No. 350,716

8 Claims. (Cl. 340—244)

The present invention relates to electrically and electronically operated level indicating means, particularly to level indicators for indicating the level of material such as agglomerations of crushed rock, coal, soil, sand, grain or slag mortar, etc. which may be stored in storage containers of any kind such as bins, silos, etc. or in piles or heaps. For the aforementioned and related fields of application it is generally necessary or at least desirable to detect the minimum level below which the available supply of stored material is too low for normal operations and the maximum level above which a further addition of material may result in an overflow. In many cases, for instance where the stored material has a rather steep angle of repose, intermediate level indications may be necessary or desirable to obtain accurate and reliable information as to the available quantity of the stored material.

The design of a level indicator suitable for indicating the level or levels of material of the general type above referred to, offers considerable difficulties. The materials the level of which is to be supervised are generally of high density and tend to shift their positions, particularly when material is added to or withdrawn from the supply. Also, many of the mentioned materials are highly abrasive. As a result, level indicators or at least the detecting means thereof which may become deeply buried in the stored material, are subjected to heavy weight, pressure, vibrations, shocks, abrasions and adherence of muddy or dusty sludges. They may also be exposed to a wide range of ambient temperature and moisture during normal operational conditions. Furthermore, the detecting means of the indicator must be frequently mounted in locations that are high above the grade or frequently in difficult, dangerous or inaccessible locations so that servicing of the indicators may be difficult and inconvenient.

There are several known designs of level indicators for materials of the type herein referred to. However, as far as the inventors are aware none of the designs as hitherto known, is capable of operating satisfactorily under the aforementioned conditions and sufficiently rugged to withstand for a reasonable period of time the abuse to which a level indicator will normally be exposed.

The principal object of the present invention is to provide a novel and improved level indicator the detecting means of which are capable of withstanding for a reasonable period of time the mechanical abuse to which indicators as herein described are normally exposed and of delivering level indicating signals which are practically independent of changes in the wetness of the material, the ambient temperatures and humidity, and which are not appreciably influenced by sludge formations adhering to the detecting means of the indicator or by an accumulation of moisture due to rain or condensate at or within the components of the detecting means.

Another object of the invention is to provide a level indicator the detecting means of which do not require any moving or fragile components and are encased in a housing structure which strongly protects the components of the detecting means against physical abuse and environmental influences such as the ambient temperature or humidity without adversely affecting the accurate response of the detecting means to changes in the level of the material to be supervised.

Another object of the invention, associated with the preceding one, is to provide in connection with the detecting means setting and locating means which permit an adjustment of the detecting means without requiring extensive disassembly of the detecting means.

Another object of the invention is to provide a design of the detecting means which permits a physical separation of the same from the power supply and the indicating means of the indicator. As a result, the detecting means proper may be mounted in the vicinity of the material while the other parts of the indicator can be disposed in a protected location convenient for servicing. This has an additional advantage that the fragile components of the indicator are disposed at a safe distance from the area of mechanical and/or other abuse.

Another object of the invention is to provide a design of the detecting means which permits a convenient replacement of the part of the detecting means subjected to the greatest wear, namely the probe tip.

Another object of the invention is to provide a novel and improved circuit system for the indicator which requires no or at least no substantial adjustment of the components of the detecting means even though these means may be subjected to substantial changes such as fluctuations in the line voltage, abrupt variations of the ambient temperature or humidity, various degrees of wetness of the material and diversity of the material.

Another object of the invention, associated with the preceding one, is to include in the circuit system a "failing safe" arrangement which automatically indicates a failure of the level indicator.

Still another object of the invention is to provide a simple and sturdy suspension structure for the detecting means so designed that the detecting means can be conveniently and safely mounted and adjusted relative to the material to be supervised.

Further objects, features and advantages of the invention will be pointed out hereinafter and set forth in the appended claims forming part of the application.

In the accompanying drawing a now preferred embodiment of the invention is shown by way of illustration and not by way of limitation.

Figure 1:
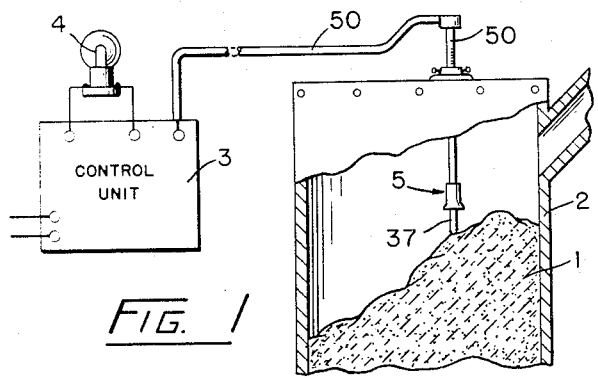
Fig. 1 is a diagrammatic view of a typical installation showing a storage bin or container partly filled with material the level of which is to be supervised by a level indicator according to the invention.

Referring first to Fig. 1 in detail, this figure shows the general organization of an installation employing a level indicator according to the invention. The material 1, the level of which is to be supervised, partly fills a bin 2 of conventional design. The material, which is shown as having a comparatively steep angle of repose, may be visualized as being crushed rock, coal, dirt, grain, mortar or any other suitable material. The level indicator is shown by a block 3 in which is housed the power supply means of the indicator and the signal means. The latter means include an indicating means which produces audible or visual indications and is symbolized by a light bulb 4. The indicating means may also operate other devices. The level indicator further includes detecting means, generally designated by 5, which are electrically connected with the power supply but physically separated therefrom. The level detecting means are the only part of the level indicator that is disposed within the bin and in the vicinity of the material 1, the level of which is to be supervised. The level detecting means serve to produce signals which are indicative of the level of the material in the bin. As previously mentioned, it is generally desirable to obtain indications of the overflow level of the material in the bin and of the minimum level. Sometimes it is desirable to obtain indications of intermediate levels. The supervision of several levels of the material requires, of course, the use of a corresponding number of detecting means 5, but for the sake of simplicity of illustration only one detecting means 5 is shown. While the detecting means are shown in vertical position for indicating the depth of the material, they may also be mounted horizontally, in which case they will indicate the supply of material in different portions of the bin.

Figure 2:
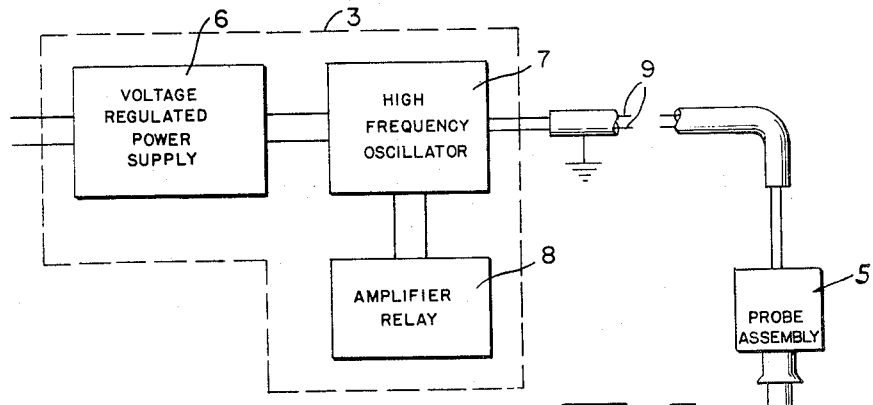
Fig. 2 is a block diagram of the electrical components of the level indicator.

The power supply means, symbolized by block 3, may produce any suitable supply of power, but it has been found that a high frequency supply is generally most advantageous for the purposes of this invention. Accordingly, Fig. 2 shows the power supply means as comprising a voltage regulated power supply unit 6 and a high frequency oscillator 7. The signal means, symbolized in Fig. 2 by a block 8, include a relay which may be directly energized but, in many cases, the use of an amplifier is preferable. The power supply means are connected with the detecting means by a shielded cable 9 which electrically shields the connections against random external interference.

Figure 3:
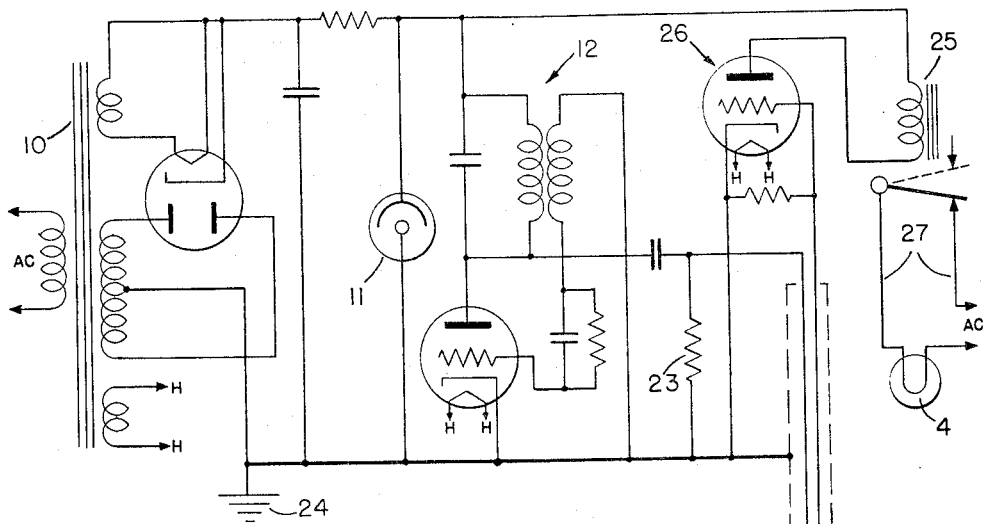
Fig. 3 is a typical circuit diagram of a level indicator according to the invention.

Fig. 3 shows in detail the circuit system of the level indicator.

Generally speaking, the primary electrical supply feeds a voltage regulated power supply suitable for energizing a high frequency oscillator in a manner generally independent of fluctuations in the supply voltage. The output of the oscillator feeds through the shielded cable to the detecting assembly 5. According to Fig. 3, alternating current is fed to a transformer 10 which transforms the input voltage to a higher voltage. This voltage is then rectified to direct current and regulated by a voltage regulator tube 11. The regulated voltage is fed to an oscillator generally designated by 12 which develops a suitable high frequency such as 160 kc.

The high frequency system just referred to is of conventional design so that a detailed description thereof is not essential for the understanding of the invention. The high frequency is passed out through shielded cable 9 to the detecting assembly 5. This assembly comprises a bridge circuit. Two of the branches of this bridge are formed by the split primary 13 of a high frequency type transformer 14. The two other branches of the bridge circuit are formed by a fixed capacitor 15 and a capacitance means constituted by a variable capacitor 16 and the capacitance of a probe component 17 to its surroundings. The surroundings of the probe component are symbolized by a grounded electrode 18. The midpoint of primary 13 is connected to one line of the shielded cable.

The secondary 19 of the transformer 14 is tuned by a capacitor 20 so that it can efficiently absorb energy from the transformer. One side of the secondary is connected to a grounded point, shown at 21, which may be formed by the shield of the cable. The other side of the secondary connects to one side of a small rectifier 22, such as a germanium type rectifier. The other side of this rectifier is connected by the second line of the shielded cable 9 through a load resistor 23 to ground at 24. The current rectified by rectifier 22 is connected back through the shielded cable to a relay 25, either directly or through an amplifier 26 of conventional design depending upon the sensitivity of the relay to be employed. The relay controls an indicating circuit generally designated by 27 and including the signal lamp 4. As will be noted, the relay is so arranged that the indicating circuit is closed when the relay coil is de-energized and is opened when the relay is energized and attracts its armature.

It will be apparent from an analysis of the probe assembly, adjustment of capacitor 16 permits to adjust the bridge circuit so that it is in balance, in which case no energy will be absorbed by secondary 19. Let it be assumed that the bridge becomes unbalanced by a change in the capacitance of probe component 17 to its surroundings. The unbalance of the bridge will cause secondary 19 to absorb energy which, after being tuned, rectified and filtered, is returned as D.-C. signal through the shielded cable 9 and amplifier 26 to relay 25.

The presence of a direct current carrying wire within the shielded cable does not materially affect the carrying of high frequency by a second wire in the same cable. As a matter of fact, it is practical at times to carry both these currents through the same wire, since there is no interaction.

Fig. 3 shows that the electric components of the detecting assembly 5 do not include any fragile parts which will be easily damaged by impact or vibration. The assembly also does not include any part that are moving during the operation. The only movable element is contained in variable capacitor 16, and this capacitor is adjusted prior to level indicating operations. Furthermore, a fully satisfactory functioning of the level indicator does not require a precise balancing of the bridge, as will appear from the subsequent discussion of Fig. 4.

Figure 4:
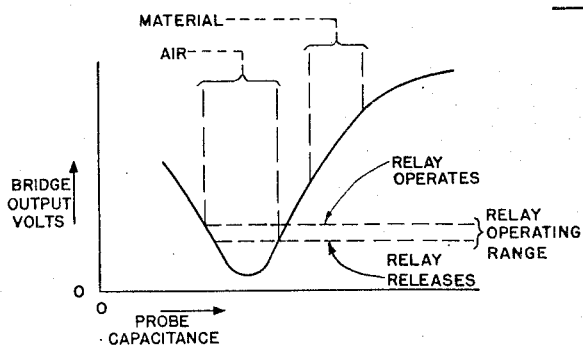
Fig. 4 is a chart showing the effect of the surroundings of the detecting means upon the signals delivered by the same.

The chart according to Fig. 4 shows the relationship of the voltage output of the bridge circuit of Fig. 3 to the capacitance of the probe component 17 to its surroundings. It will be observed that the output of the bridge is at a minimum when the probe component is surrounded by air. This is indicated by the area between the vertical dash-lines which encompasses the lowest portion of the curve and is marked "Air." The variable capacitor 16 is so set that the bridge is approximately in balance when the probe component is in air. The configuration of the curve and the location of said vertical lines indicate that the normal variations of the probe capacitance to its surroundings including those variations that are caused by temperature, humidity, aging, etc. are not sufficient to bring the output voltage of the bridge above the level designated by the horizontal dash-lines and marked "Relay operating range." While the curve shown in Fig. 4 may change for specific applications, it is inherently of the form shown so that the output voltage of the detecting assembly will always remain well below the critical value for which the relay is set to operate. This has the advantage that any changes to which the probe component is exposed during normal operation cannot vary the balance of the bridge to such an extent that lamp 4 is illuminated as long as probe 17 is surrounded by air.

Let it now be assumed that the bin is filled to such an extent that the probe is submerged in the material to be supervised.

As is well known, most materials carry high frequency electric currents far better than air, as is evidenced by the dielectric constant of solid materials being very high in relation to air. Generally speaking, solid materials carry high frequency current at least twice as well as does air, and may actually be at least four to eight times or even more effective. As a result, the bridge output becomes quite high when the probe is surrounded by the material. The voltage output of the bridge, when the probe component is surrounded by material, is indicated at vertical dash-lines marked by "Material." As will be noted, these latter two vertical lines define a voltage level of the curve well above the operating range of the relay so that the same will attract its armature and extinguish lamp 4.

As previously explained, there is a considerable jump between the voltage output of the bridge when the probe is surrounded by air and the voltage output when the probe is in contact with the material. Accordingly, the two ranges marked in Fig. 4 by "Air" and "Material" are well spaced from each other and there is no overlapping area. Consequently, there is practically no possibility that the level indicator will indicate that the bin level for which it is set, is reached unless the level is actually reached.

The previous explanation makes it also clear that the function of the indicator as explained in connection with Fig. 4 is the same when the level of the material falls below the level for which the probe indicator is set. In that event, the voltage output of the bridge drops abruptly from a high output to the minimum output whereby the relay is energized and the circuit of signal lamp 4 is opened.

According to Fig. 3 and the previous description, the signal means are so arranged that the signal lamp is extinguished whenever the probe is surrounded by air. It is, of course, also possible to arrange the signal means so that they are extinguished when the probe is surrounded by material. However, the illustrated arrangement has the advantage that it constitutes a "failing safe" system in that the signal means will not only be illuminated when the probe is surrounded by material, but also when there is a failure in the circuit system of the indicator.

Figure 5:
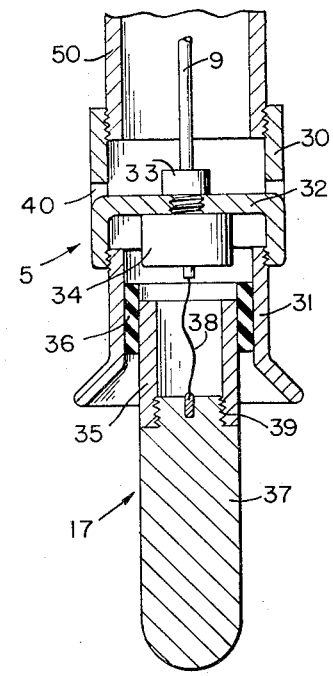
Fig. 5 is a sectional detail view of the mechanical structure of the detecting means.
Figure 6:
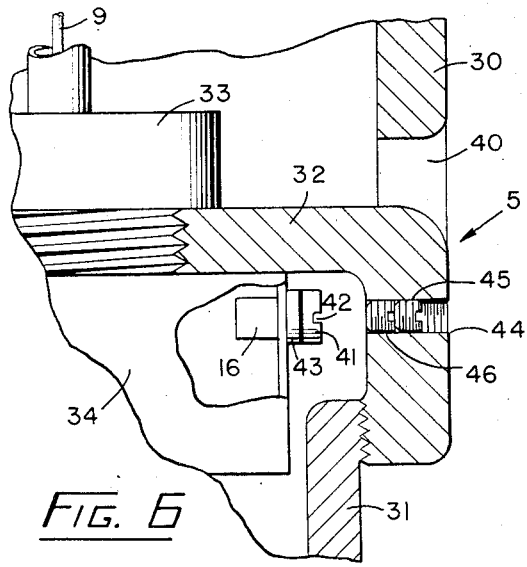
Fig. 6 is a fragmentary detail view of the mechanical structure of the detecting means on an enlarged scale.

Referring now to Figs. 5 and 6, which show the structural design of the detecting assembly 5, the entire assembly is encased in a protective rigid casing. This casing is of generally tubular shape and comprises an upper portion 30 and a lower portion 31 fastened to the upper portion, for instance, by a thread connection. Casing portion 30 is formed with a transverse partition wall 32 in which is fitted a waterproof connector 33 by means of which the shielded cable 9 is led into a closed housing 34 in which are disposed the electrical components of the detecting assembly, with the exception of the probe component 17. This component preferably comprises two portions, the upper portion 35 is secured to and supported by the lower casing portion 31. An insulation ring 36 insulates the probe component from the casing. The lower portion of the probe component is shown as a solid antenna tip 37, which is connected by a wire 38 with the electrical components within the housing 34. Inasmuch as the antenna tip 37 comes directly in contact with the material, it is subjected to considerable wear and tear. By providing a probe component 17 composed of two portions, the tip 37 can be easily replaced when necessary. It will be observed that tip 37 is shown as being connected with the probe component 35 by means of a thread connection 39.

As can be clearly seen on Fig. 5 the lower compartment or space within the casing within which housing 34 is located is completely closed, thereby further protecting the electric components in housing 34 against impact and influence of the ambient temperature, humidity, etc. Casing portion 31 is outwardly flanged to form an apron protecting the insulator. Water and condensation which may accumulate in the compartment above wall 32 is discharged through vent holes 40.

To permit adjustment of capacitor 16 without being compelled to disassemble the entire probe assembly or a substantial part thereof, capacitor 16, indicated in Fig. 6 by a block, has an adjustment arrangement 41 fitted outside of housing 34. This arrangement may be provided with a screwdriver slot 42 and rotation of the arrangement relative to a stationary part 43 of the capacitor results in an adjustment of the capacitance of the capacitor. Adjustments of this type are known per se so that a detailed description thereof is not essential for the understanding of the invention. Adjustment arrangement 41 is accessible through a threaded hole 44 in casing portion 33. This hole is normally sealed, for instance by two aligned screws 45 and 46.

As was previously mentioned, the probe or detecting assembly 5 is physically separated from the power supply and the signal means and is disposed in the vicinity of the material to be supervised.

It is essential that the probe assembly can be conveniently mounted and moved and that its position relative to the material to be supervised can be adjusted without involving structural changes in the supporting structure and without requiring considerable labor.

Figure 7:
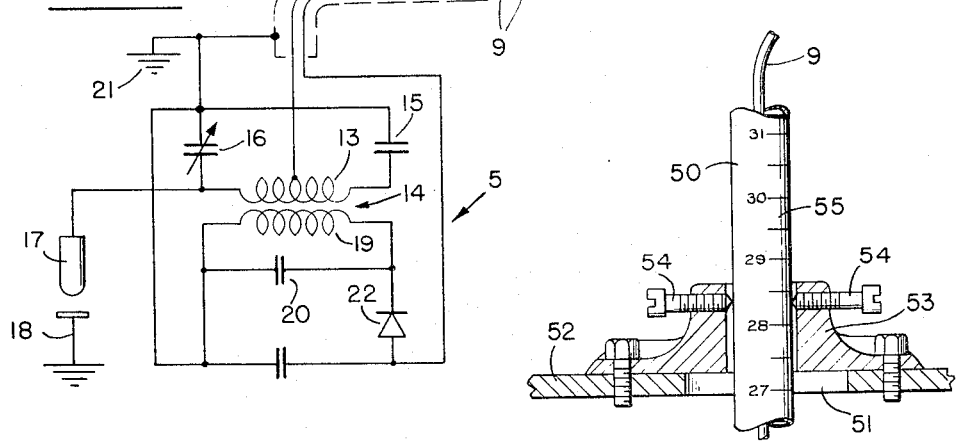
Fig. 7 is a fragmentary sectional view of the suspension or support means for the detecting means.
Figure 7:
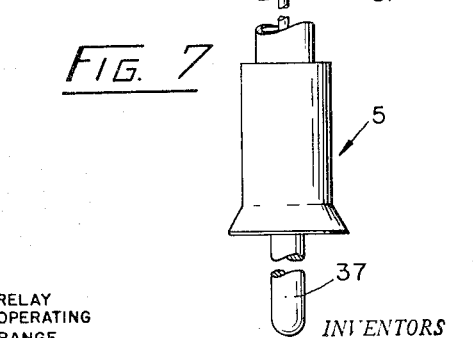

For this purpose, the shielded cable 9 is encased in a pipe 50 which also serves to protect the shielded cable. According to Fig. 7, the pipe is passed through an opening 51 provided for this purpose in the top wall 52 of bin 2. The inner end of the pipe is secured to upper casing portion 30, for instances by a thread connection, as can best be seen on Fig. 5.

The top wall 52 of the bin may be reinforced by a collar 53, and the probe assembly is fixed in a selected axial position by means of set screws 54. The pipe portion adjacent to the supporting member is preferably provided with an elongated scale 55, calibrated in degrees of the angle of repose of the material 1.

While wall 52 has been referred to as the top wall of the bin, it will be apparent that it may also be merely part of a support frame or similar support structure. It is only essential that the pipe and, with it, the probe assembly are sufficiently so supported that the piling of material adjacent to the probe will not deflect the same much from its intended position.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A level indicator for supervising the level of an agglomeration of material having abrasive and impact causing properties, the said indicator comprising two separate units, one of said units including impact sensitive electronic power supply means for generating a high frequency current and impact sensitive signal means and the other unit constituting a level detecting means and including an impact resistant closed casing for suspension in a level supervising position in which it is exposed to direct physical contact with the material to be supervised, capacitance bridge means disposed within said casing for protecting the bridge means from damage by said material, the said bridge means comprising as sensing means a single probe element protruding from the casing electrically insulated therefrom and forming together with its surroundings including said material a component of said bridge means the capacitance of which varies as a function of changes in the spatial relationship of said probe element relative to the material, the said changes in capacitance generating a control signal, and rectifying means for rectifying said control signal; and a cable of any desired length electrically connecting said two units, said cable including conductor means for feeding said high frequency current to the capacitance bridge means and other conductor means for returning the rectified control signal to said signal means.

2. A level indicator according to claim 1, wherein the said capacitance bridge means includes in one of its branches said probe element and a variable capacitance adjustable for balancing said bridge means and in another branch a fixed capacitance, the said signal means being set to respond to an unbalance in the bridge means exceeding a predetermined value.

3. A level indicator according to claim 1, wherein the said capacitance bridge means comprises in one branch said probe element and a variable capacitance adjustable for balancing said bridge means when the said probe element is surrounded by air and in a second branch a fixed capacitance, and wherein said indicator further comprises a transformer disposed within said casing, the primary of said transformer being connected at its midpoint with said power supply means and at its ends with said bridge means, the secondary of said transformer being connected in circuit with said rectifying means and said signal means for control of the latter, the said signal means being controlled by the rectified signal flowing through the circuit including said secondary in response to an unbalance in the bridge means exceeding a predetermined value.

4. A level indicator according to claim 1, wherein the said signal means include relay means having an exciting coil connected in circuit with said rectifying means for energizing the relay means by said rectified signal, and wherein an indicating circuit is controlled by said relay means, said indicating circuit being set to be controlled for producing one signal when said relay means are energized and another signal when said relay means are deenergized, the signal in response to the energization of the relay means being indicative of the probe element being surrounded by air and the signal in response to the deenergization of the relay means being indicative of the probe element being surrounded by material and of a failure of the indicator.

5. A level indicator according to claim 1, wherein said probe element comprises two detachably joined parts, one of said parts being secured within the protective casing electrically insulated therefrom and ending substantially within the casing.

6. A level indicator according to claim 5, wherein said probe element protrudes from the lower end of the protective casing, said lower end forming an outwardly flanged apron for shielding the probe part secured within the casing and the insulation thereof against the impact of material.

7. A level indicator according to claim 1, comprising a supporting means supporting said casing adjustable in its spatial relationship relative to the level of the material to be supervised.

8. A level indicator according to claim 7, wherein said support means comprise a support pipe for supporting said casing, said pipe being mounted axially displaceable and encompassing said cable, and wherein said support means further comprise locking means coacting with said pipe for locking the same in a selected axial position whereby the spatial position of the probe element relative to the material to be supervised is variable.

References Cited in the file of this patent

UNITED STATES PATENTS

| | | |
|---|---|---|
| 1,520,004 | Block | Dec. 23, 1924 |
| 2,032,016 | Hitner | Feb. 25, 1936 |
| 2,178,471 | De Bruin | Oct. 31, 1939 |
| 2,390,221 | Lindsay et al. | Dec. 4, 1945 |
| 2,411,248 | Cohen | Nov. 19, 1946 |
| 2,550,488 | Marsh | Apr. 24, 1951 |
| 2,648,058 | Breedlove | Aug. 4, 1953 |

FOREIGN PATENTS

| | | |
|---|---|---|
| 398,065 | Great Britain | Sept. 7, 1933 |